United States Patent [19]
Dugan et al.

[11] Patent Number: 5,335,244
[45] Date of Patent: Aug. 2, 1994

[54] TECHNIQUE AND APPARATUS USING A MOVEABLE WEAK LENS

[75] Inventors: John P. Dugan, Cincinnati; James N. Hayes, Urbana, both of Ohio; Steve M. Elliott, South Hamilton, Mass.

[73] Assignee: Spectra-Physics Laserplane, Inc., Dayton, Ohio

[21] Appl. No.: 108,899

[22] Filed: Aug. 18, 1993

Related U.S. Application Data

[63] Continuation of Ser. No. 893,260, Jun. 4, 1992, Pat. No. 5,257,279.

[51] Int. Cl.⁵ .................................................. H01S 3/08
[52] U.S. Cl. .................................... 372/101; 372/99; 372/98; 372/107; 356/153
[58] Field of Search ............... 372/101, 99, 98, 92, 372/107, 108; 356/153

[56]   References Cited
   U.S. PATENT DOCUMENTS

| | | | |
|---|---|---|---|
| 3,627,429 | 12/1971 | Jaenicke | 356/153 |
| 3,707,687 | 12/1972 | Hercher et al. | 372/53 |
| 4,111,564 | 9/1978 | Trice, Jr. | 356/247 |
| 4,221,483 | 9/1980 | Rando | 356/250 |
| 4,601,452 | 7/1986 | Rando | 248/178 |
| 4,662,707 | 5/1987 | Teach et al. | 350/6.5 |
| 4,679,937 | 7/1987 | Cain et al. | 356/138 |
| 4,699,447 | 10/1987 | Howard | 350/619 |
| 4,767,208 | 8/1988 | Cain et al. | 356/138 |

Primary Examiner—Georgia Y. Epps
Attorney, Agent, or Firm—Killworth, Gottman, Hagan & Schaeff

[57] ABSTRACT

An assembly for use in a laser instrument which produces a plane of laser light by reflection from a cone. The assembly includes a weak focusing lens which improves the control over the planarity of the plane of light produced. Because it is weak, the weak focusing lens can be positioned over a relatively large distance to produce slight changes in the focus of the beam which is reflected to produce the plane of light. Critical, time consuming, and expensive manufacturing requirements can be relaxed, while improved performance results in superior laser instruments.

20 Claims, 5 Drawing Sheets

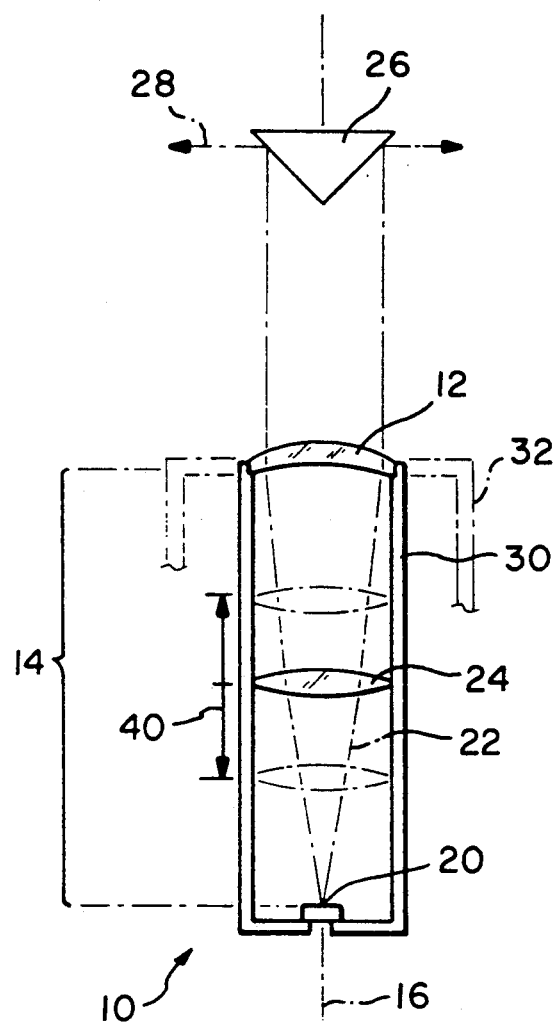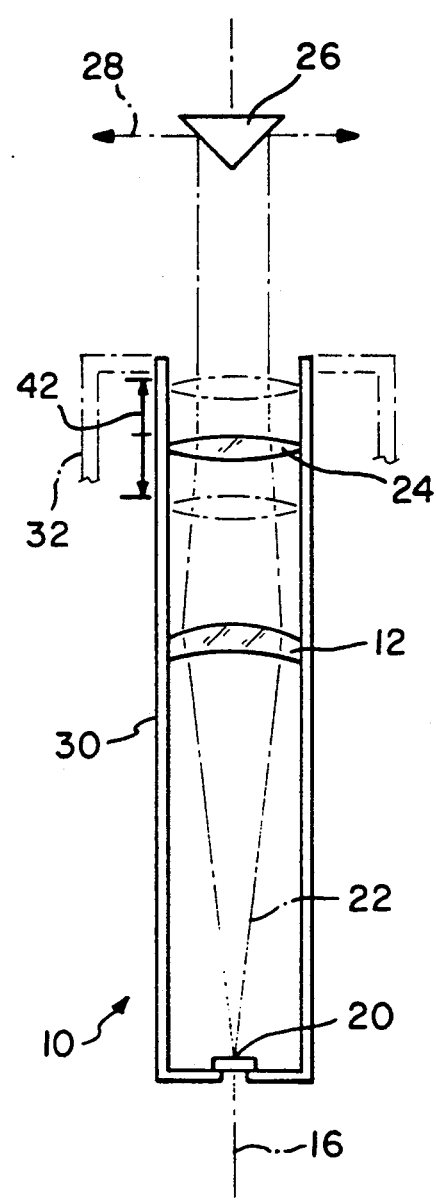

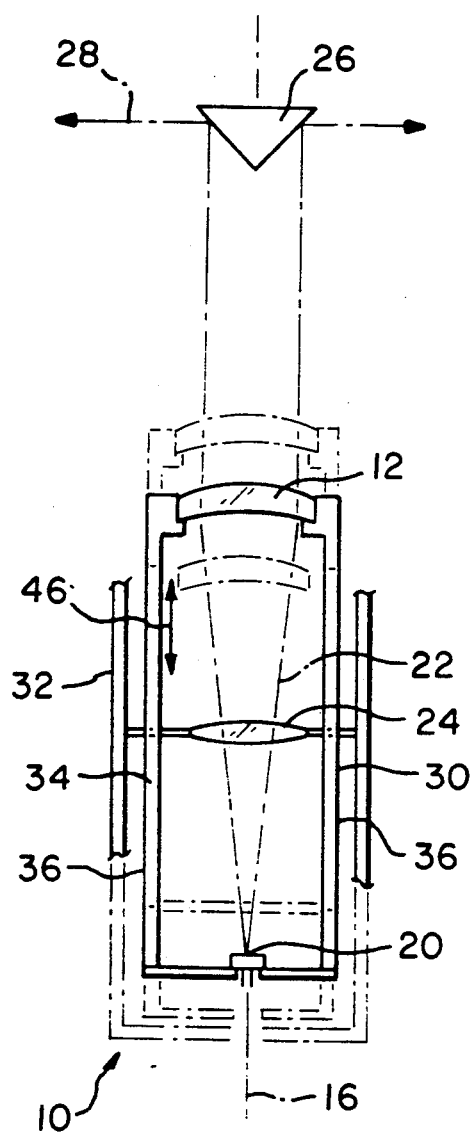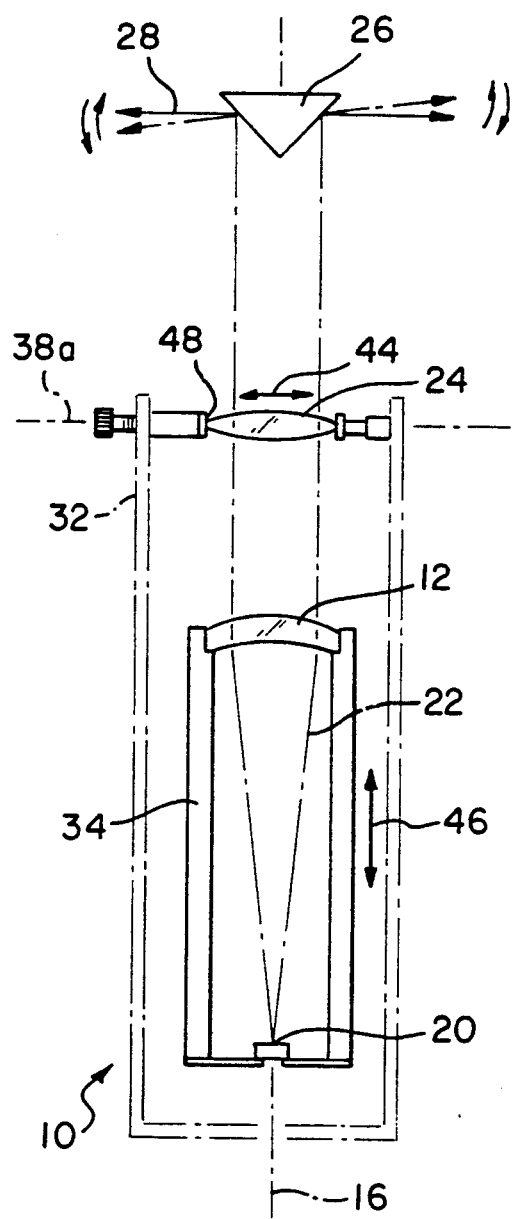

TECHNIQUE AND APPARATUS USING A MOVEABLE WEAK LENS

CROSS-REFERENCE TO RELATED APPLICATION

This is a continuation of application Ser. No. 07/893,260, filed Jun. 4, 1992, U.S. Pat. No. 5,257,279.

BACKGROUND OF THE INVENTION

The present invention relates to the focusing of laser light emitted by laser instruments and, in particular, to the use of a weak focusing lens to improve the focus and alignment of a plane of laser light reflected from a cone in a laser instrument.

In many laser instruments a collimating lens or nearly collimating lens is used with a small source of laser light, such as a laser diode, to produce a beam of laser light which is either substantially collimated or focused to a distant focal point in the far field. In addition to producing beams of laser light, laser instruments also produce planes of laser light. In one such laser instrument 1, shown in part in FIG. 1A, a suspended, reflective cone 2 is used to reflect an axially oriented beam 3 of laser light 4 to produce a plane 5 of laser light. Where the reflective cone 2 is centered in the beam 3, the reflected laser light 4 emanates radially as a plane 5 in all directions with substantial uniformity. In many such laser instruments 1 the incident beam 3, and thus the reflected plane 5 of laser light 4, have a distant focal point.

Where reflective cones are used to produce planes of laser light, the angle at which laser light rays strike the cone is critical to the production of a level plane of light. Even slight changes in the angle at which the laser light rays strike the reflective cone will cause an umbrella-like shift in the plane of laser light produced, causing the plane to have a slightly conical shape, as also shown in FIG. 1A. Thus, it has been found that proper beam focus is needed to produce a level plane of laser light.

Laser diodes are typically used as a small laser light source 6 in such laser instruments 1. Ideally, the laser diode is at the design back focus distance of a collimating lens or nearly collimating lens 7, so that the intended beam of collimated or slightly focused laser light will be produced. However, where the separation between the laser diode and lens 7 varies from the design back focus distance, the angle at which laser light rays strike the reflective cone varies, and a large change in the planarity of the reflected light can result. It has been found that a change of 1 arc second, i.e. 1/3600 of 1 degree, in the angle of the incoming laser light rays is sufficient to produce the umbrella-like shift to an objectionable degree in the plane of laser light shown in FIG. 1A.

Several sources of such variation exist, but have been overcome by adherence to tight manufacturing tolerances. For example, during assembly of such laser instruments, mounting errors can cause the distance between the laser diode and collimating lens to vary. As well, each laser diode lases at a spot which cannot be exactly predetermined in all three dimensions. This variation from laser diode to laser diode effects the ability to mount the laser diode at the design back focus distance of the collimating lens. In addition, the curvature of the collimating lens surfaces can vary within a tolerance from lens to lens, causing the actual back focus distance to vary from the design back focus distance. To control the effect of these sources of variation, in the assembly of laser instruments, the distance from the laser source to the collimating lens has been tightly controlled to tolerances up to ±0.0003 inches.

As well, as there is variation from laser diode to laser diode in the spot at which the diodes lase, there is a limit to how closely the laser diode can be located on the focal axis 8 of the collimating lens or nearly collimating lens 7. As shown in FIG. 1B, where like numerals represent like elements, axial misalignment of the laser diode can also cause a tilting of the plane of laser light produced.

Because a very slight change in the back focus distance can have a critical effect on the focus of the beam and planarity of the plane produced, even after careful assembly, laser instruments using reflective cones require further testing and adjustment. The position of either the collimating lens or laser diode, and the separation therebetween is adjusted, as needed, to produce a plane of laser light having the desired orientation and planarity.

After installation in laser instruments, laser diodes occasionally burn out during use and need to be replaced. Since there is no adjustment of the collimating lens after initial installation and there is variation from laser diode to laser diode in the spot at which the diodes lase, there is a limit to how accurately the new laser diode can be matched to the design back focus distance of the collimating lens. Due to the sensitivity of reflected planes of laser light to the beam focus, planarity of the laser light plane produced by the repaired laser instrument can be effected, as shown in FIG. 1A. As well, there remains a limit to how closely the new laser diode can be located on the focal axis, and axial misalignment of the laser diode can, again, cause a tilting of the plane of laser light produced by the repaired laser instrument, as shown in FIG. 1B. Thus, when laser diodes are replaced, it becomes likely that the new beam produced in the laser instrument will be slightly out of focus and slightly off axis, causing a variation in both the planarity and the angular orientation of the plane of laser light produced.

Despite the necessity for careful manufacturing techniques, laser diodes have been successfully used as laser sources in a variety of laser instrument applications. However, the need exists for greater ease and flexibility in controlling the planes of light produced from laser diodes in laser instruments, and for replacement of laser diodes in a manner which will compensate for their inherent variability.

SUMMARY OF THE INVENTION

The present invention satisfies that need, by providing an assembly for use in a laser instrument which improves both the ease and the precision with which adjustment in the beam focus may be achieved to produce a plane of light. As a result, critical, time consuming, and expensive manufacturing requirements can be relaxed, while performance of the laser instrument is improved.

The assembly of the present invention includes a nearly collimating lens having a design back focus distance defined along the focal axis thereof, and a small laser light source substantially positioned at the back focus distance of the nearly collimating lens which is oriented such that the collimated lens receives at least a portion of the laser light from the laser light source. In accordance with the present invention, the assembly further includes a weak focusing lens, i.e. a lens having a long focal length, disposed along the focal axis. The weak focusing lens is spaced from the nearly collimating lens to also receive a portion of the laser light. The nearly collimating lens and weak focusing lens collect more light from the laser diode than previous designs, permitting some increase in range of a laser instrument. Finally, the assembly includes a reflective cone positioned along the focal axis to reflect at least some of the laser light in a plane. The plane may emanate from the reflective cone in an arc of 360 degrees or less.

The inclusion of the weak focusing lens permits greater control over the focus of the laser beam which strikes the reflective cone. Because it is weak, the weak focusing lens can be positioned along the focal axis over a relatively large distance to produce slight changes in the beam focus, allowing fine control over the beam focus and the plane of light produced, resulting in superior laser instruments. Moreover, given this added capability, the tight manufacturing tolerances required in the prior art can be relaxed, and the sensitivity of the beam focus to the exact positioning of the laser source at the back focus distance can be overcome.

In the preferred embodiment, the laser light beam is focused to a distant focal point in the far field, and the reflective cone reflects the laser light in an arc of 360 degrees focused at a finite distance in a single plane emitting from the reflective cone.

Further, in the preferred embodiment the weak focusing lens is mounted for displacement along at least one axis which is at an angle relative to the focal axis of the nearly collimating lens. As a result, where the laser light is produced with slight axial misalignment, causing tilting of the plane of laser light emanating from the reflective cone shown in FIG. 1B, the weak focusing lens can be decentered to translate the laser light passing therethrough and change the grade of the plane of laser light. A preferred lens mounting including a fine calibration mechanism provides fine sensitivity to adjustment and mechanical stability which is substantially free from hysteresis.

In a further aspect of the present invention, a method is provided for assembling a laser instrument assembly. The method provides improved control over the focus of a laser light beam which strikes a reflective cone to produce a plane of laser light. The method for assembling includes the initial steps of obtaining a laser diode, a nearly collimating lens having a back focus distance defined along the focal axis thereof, a weak focusing lens, and a reflective cone. The method next includes the steps of positioning the nearly collimating lens in a mounting, mounting a laser diode substantially at the back focus distance of the nearly collimating lens, and securing the nearly collimating lens in the mounting. This step of positioning positions the nearly collimating lens to receive at least a portion of the laser light produced by the laser diode and to coarsely focus the path of the laser light. Next, the method calls for positioning a weak focusing lens along the focal axis spaced from the nearly collimating lens to receive the laser light, positioning the reflective cone along the focal axis spaced from the laser diode with the nearly collimating lens and weak focusing lens positioned therebetween, where the reflective cone is positioned to reflect at least some of the laser light in an plane, adjusting the separation between the weak focusing lens and the nearly collimating lens to finely control the focus of the laser light which is reflected to produce a plane of laser light, and securing the weak focusing lens in a mounting in a position in which it provides the necessary focus of the laser light to produce a plane. This method for assembling allows laser light from the laser diode to be focused with greater control and precision onto the reflective cone to produce a plane of light therefrom with greater ease.

In accordance with the method of the present invention, the nearly collimating lens and the weak focusing lens may, as a lens pair acting together, collimate the light from the laser diode. Preferably, the nearly collimating lens and weak focusing lens, acting together, have a distant focal point in the far field so that the reflected laser light focuses at a finite distance in a single plane emitted from the reflective cone.

Accordingly, it is an object of the present invention to provide an apparatus and method for producing a plane of laser light from a laser instrument using a reflective cone with improved control and greater precision in achieving planarity of the reflected light. It is a further object of the present invention to reduce the effort required to assemble and adjust a laser instrument producing a plane of laser light from a reflective cone. It is a further object of the present invention to relax tight manufacturing tolerances required to produce suitably planar laser light planes in laser instruments, while improving the precision of such instruments. These and other objects of the invention will be apparent from the following detailed description, accompanying drawings, and appended claims.

BRIEF DESCRIPTION OF THE DRAWINGS

FIGS. 2 and 3 are schematic views of the present invention showing the weak focusing lens in first and second configurations, respectively, wherein adjustment in the position of the weak focusing lens provides focusing of the laser beam and control over the plane of laser light produced.

FIGS. 4 and 5 are schematic views of the present invention showing the weak focusing lens in third and fourth configurations, respectively, wherein the laser source and nearly collimating lens are disposed on the same mounting and adjustment in the position of the nearly collimating lens and laser source provides focusing of the laser beam and control over the plane of laser light produced.

DETAILED DESCRIPTION OF THE PREFERRED EMBODIMENTS

Figure 1A:
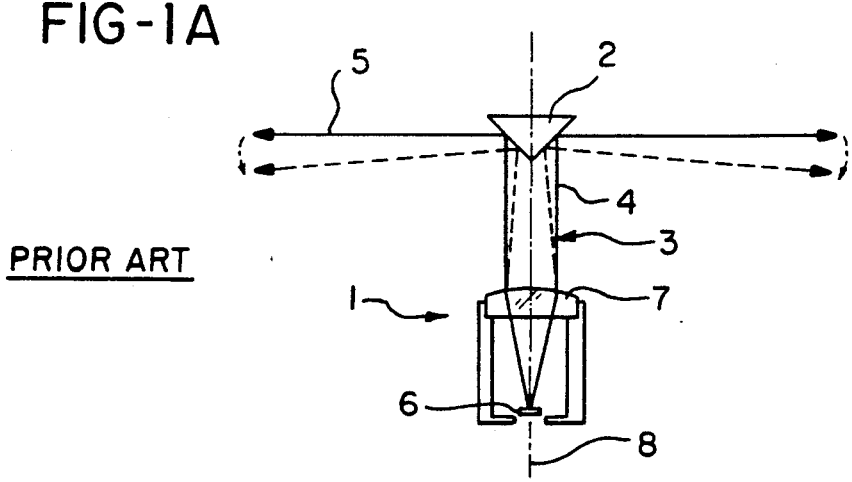
FIG. 1A is a schematic view of the prior art showing the effect of laser beam focus on planarity.

Referring to FIGS. 2-6, the assembly 10 of the present invention includes a nearly collimating lens 12 having a design back focus distance 14 defined along the focal axis 16 thereof, and a small laser light source 20 substantially positioned at the back focus distance 14 of the nearly collimating lens 12. The nearly collimating lens 12 is oriented to receive at least a portion of the laser light 22 from the laser light source 20 and coarsely focus the laser light 22. In accordance with the present invention, the assembly 10 further includes a weak focusing lens 24 disposed along the focal axis 16 and spaced from the nearly collimating lens 12 to also receive a portion of the laser light 22, and a reflective cone 26 positioned along the focal axis 16 to reflect at least some of the laser light 22 in an arc. It is preferred, in accordance with the present invention, that the laser light source 20 is a laser diode. The reflective cone 26 is preferably positioned in the center of the beam of laser light produced in the assembly 10 so that a substantially uniform plane 28 of laser light emanates radially outward. It is also preferred to reflect the laser light 22 in a 360 degree arc.

In a preferred embodiment, the laser light 22 which is incident on the reflective cone 26 is focused to a distant focal point in the far field, and the reflective cone 26 reflects the laser light 22 in an arc of 360 degrees to focus at a finite distance in a single plane emitting from the reflective cone. Typically, laser instruments producing planes of laser light have a design focal distance in the far field of approximately 1000 feet. To achieve this focus, in the preferred embodiment it is further provided that the nearly collimating lens 12 has a distant focal point, and is positioned such that the distance between the laser source 20 and nearly collimating lens 12 provides a coarse focus of the laser light 22 in the far field. The weak focusing lens 24, which is disposed along the focal axis 16 and spaced from the nearly collimating lens 12, further provides fine focus of the laser light 22 in the far field.

Alternatively, the nearly collimating lens 12 and weak focusing lens 24 may be positioned in the assembly 10 such that the portion of laser light 22 which passes therethrough is substantially collimated.

In the preferred embodiment, the reflective cone 26 is a right angle cone. However, alternatively, the reflective cone 26 may include a slight concave curvature in its reflective surfaces which can serve to provide focusing of laser light 22 which is reflected therefrom. A right angle cone 26 is preferred for its relative ease of fabrication and ease of alignment. The angle between the reflective cone surfaces, as viewed in cross-section, is preferably nearly 90 degrees, and more precisely, about one minute greater than 90 degrees.

Still referring to FIGS. 2-6, in accordance with the present invention, the laser source 20, nearly collimating lens 12 and weak focusing lens 24 may be variously configured to control the focus of laser light 22 and the plane 28 of laser light produced by the assembly 10. Two basic arrangements are provided for focus control. In the first and second configurations, the weak focusing lens 24 moves to provide focus control while the laser source 20 and nearly collimating lens 12 are fixed in position. In the third and fourth configurations the weak focusing lens 24 is fixed in position and the laser source 20 and nearly collimating lens 12, mounted in fixed relationship on a mounting, are moved together to provide focus control. Regardless of the configuration, the range of displacement possible between the weak focusing lens 24 and nearly collimating lens 12 in accordance with the present invention permits great sensitivity in focus adjustment.

A first configuration is shown in FIG. 2 wherein the weak focusing lens is disposed between the small laser light source 20 and the nearly collimating lens 12, and spaced from the nearly collimating lens 12. These components are illustratively shown disposed in a barrel 30 which, in turn, is disposed in a laser instrument housing 32. As indicated in phantom and by arrow 40, the weak focusing lens is adjustably positionable axially in the barrel 30, and a large displacement in the position of the weak focusing lens 24 is possible to provide desired focusing of laser light 22 and adjustment in the plane 28 produced by reflection thereof.

A second configuration is shown in FIG. 3 wherein the nearly collimating lens 12 is disposed between the small laser light source 20 and the weak focusing lens 24. Again, weak focusing lens 24 is illustratively shown in a barrel 30 in a housing 32. The weak focusing lens 24 can again be slidably or adjustably positioned axially in the barrel 30 over a relatively long distance, as indicated in phantom and by arrow 42, to achieve the same effect on laser light 22 and plane 28.

Third and fourth configurations are shown in FIGS. 4 and 5, respectively. In these two configurations, the assembly 10 includes a mounting 34 on which nearly collimating lens 12 and the laser source 20, preferably a laser diode, are mounted in a fixed relationship. In both of these configurations, the weak focusing lens 24 is fixed in position along the focal axis 16, and the nearly collimating lens 12 and laser source 20 move together in fixed relationship on the mounting 34. Mounting 34 is slidably or adjustably positionable axially in the housing 32, as indicated by arrow 46, to vary the distance between the nearly collimating lens 12 and the weak focusing lens 24 to provide desired focusing of laser light 22 and adjustment in the plane 28 produced by reflection. In the third configuration of FIG. 4, the weak focusing lens 24 is disposed between the laser source 20 and the nearly collimating lens 12 and supported through a plurality of slots 36 in the walls of the barrel 30. In the fourth configuration of FIG. 5 the nearly collimating lens 12 is positioned between the laser source 20 and the weak focusing lens 24. The same effect on focus and planarity may be achieved.

Figure 6:
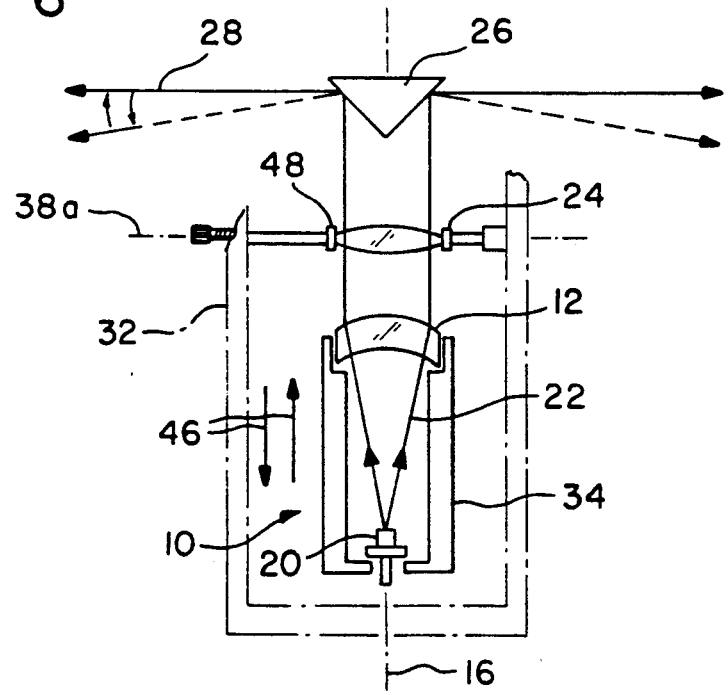
FIG. 6 is a schematic cross-sectional view of a preferred embodiment of the present invention used in producing a plane of laser light.
Figure 8:
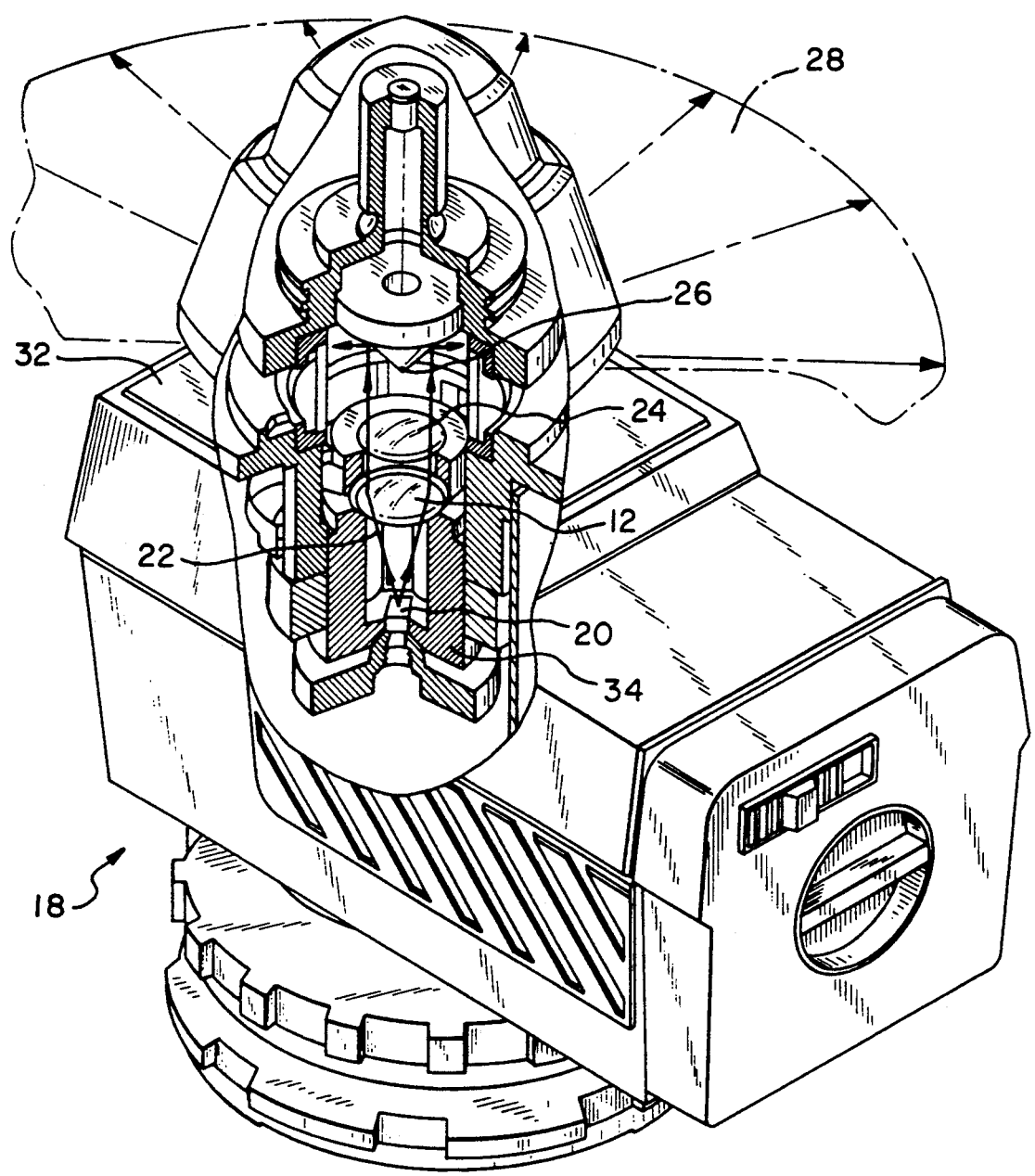
FIG. 8 is a perspective view of a laser instrument cut away to show the preferred embodiment of FIG. 6 therein.

In accordance with the present invention, the fourth configuration is preferred, and is shown in FIG. 6 to further illustrate the effect of slidably positioning the mounting 34 to produce desired planarity in the plane 28 of laser light. The assembly 10 in its preferred embodiment is further shown in FIG. 8, in the housing 32 of a laser instrument 18. Typically, such laser instruments 18 are used to produce control planes for laser guided construction equipment, and thus the planes 28 of laser light are to be perpendicular to the force of gravity.

Figure 1B:
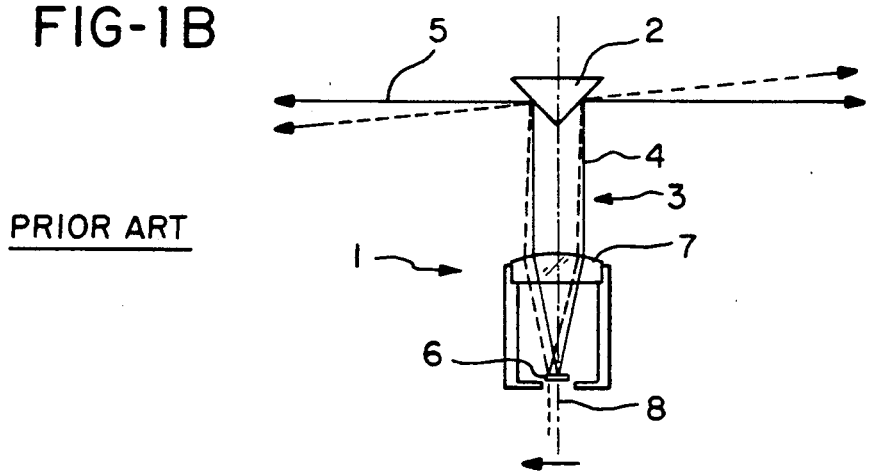
FIG. 1B is a schematic view of the prior art showing tilting of the reflected plane due to misalignment of the laser source.

In accordance with the present invention, it is preferred that the weak focusing lens 24 be disposed such that the focal axis 16 of the nearly collimating lens 12 extends through the center of the weak focusing lens. However, mounting errors may cause slight misalignment of the nearly collimating lens 12 or weak focusing lens 24. As well, the laser light source 20 can lase at a point which is slightly off-axis, or may be mounted slightly off-axis. As a result, the laser light 22 may be produced with a slight off-axis orientation which can cause the tilting effect illustrated in FIG. 1B, and which requires correction. By tilting or decentering the weak focusing lens 24, the laser light 22 passing therethrough is translated, and has the effect of changing the path of the laser light beam and the grade of the laser light plane 28 produced. Tilting and incorrect orientation of the plane 28 produced can, thereby, be corrected. It has been found that the tilting or decentering of the weak focusing lens 24 required to adjust for misalignment over a small range will cause very little wavefront error in the plane 28.

Therefore, as representatively shown in FIG. 5, the weak focusing lens 24 is mounted for displacement along at least one axis 38a which is at an angle relative to the focal axis 16 of the nearly collimating lens 12. Adjustment of the weak focusing lens along one transverse axis 38a to correct for off-axis orientation of the laser light is shown by arrow 44. The corresponding effect on the plane of laser light produced is representatively indicated. While adjustment along one axis 38a is shown, it is understood that adjustment can be made along a plurality of axes. The configuration of FIG. 5 is preferred because the element (mounting 34) carrying components responsible for axial adjustment for focus control is separate from the element (mounting 48) carrying a component which is adjusted to correct axial misalignment of the laser light 22. The mountings required for the respective components are thereby simplified. It is understood, however, that the two adjustments could be combined in a single element, although separation is preferred for simplicity. Thus, although illustrated only in FIGS. 5 and 6 for clarity, such capability for displacement is preferred in accordance with each configuration.

Figure 7A:
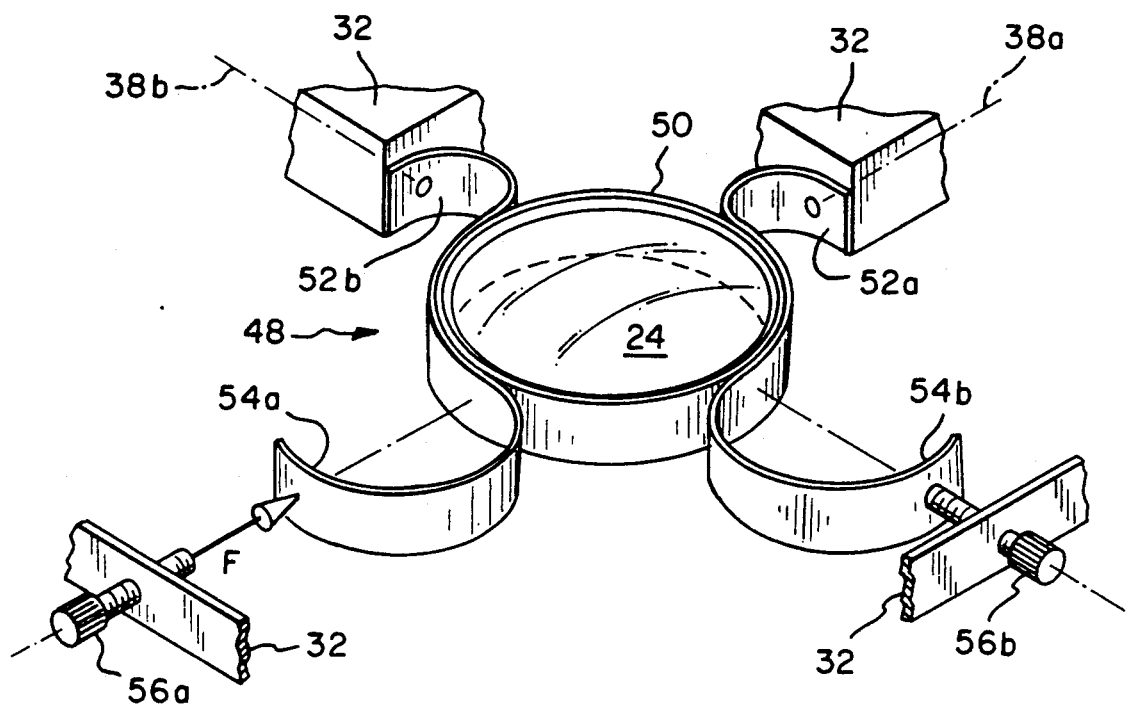
FIG. 7A is a detail perspective view of the mounting shown in FIG. 5 in accordance with the present invention wherein the position of a lens may be finely adjusted.
Figure 7B:
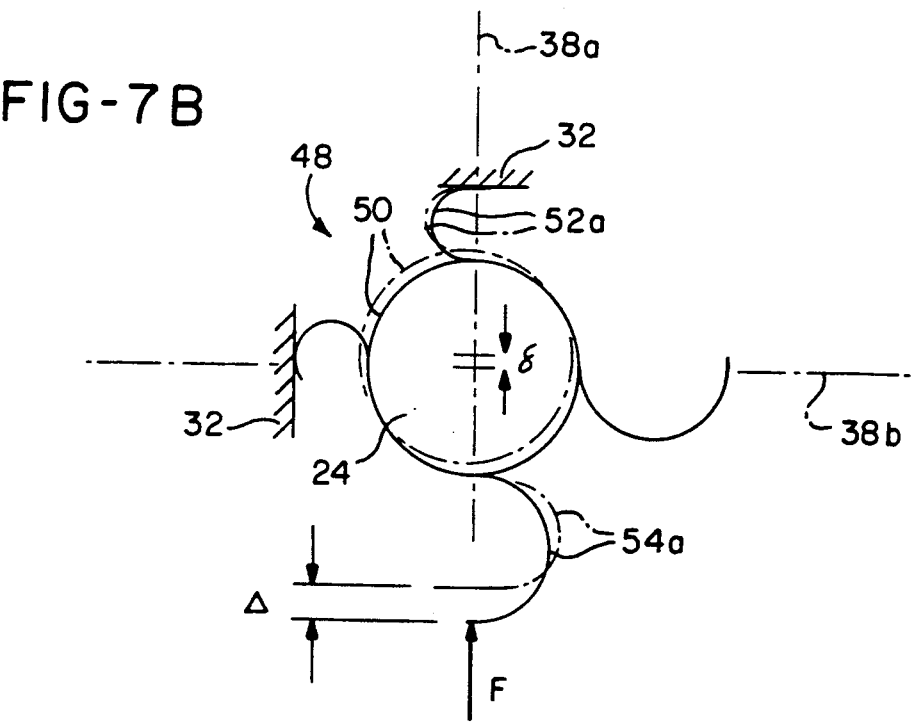
FIG. 7B is a plan view of the mounting of FIG. 7A.

In FIGS. 7A and 7B, the preferred mounting 48 for the weak focusing lens 24 is shown schematically in greater detail. The mounting 48 is preferred because it has fine sensitivity to adjustment, providing approximately 30 arc seconds of change in the path of the laser light 22 per thousandth of inch of lens movement (as measured at the center of the lens), and further provides mechanical stability which is free from adjustment hysteresis.

The mounting 48 includes a rigid lens carrier 50 in which a lens is secured, and four radial leaf springs 52a, 54a, 52b and 54b. Two of the leaf springs 52a and 52b have small radii $r_a$ and $r_b$, respectively, while two of the leaf springs 54a and 54b have larger radii $R_a$ and $R_b$, respectively. The leaf springs are oriented so that the large radius springs 54a and 54b are opposite the small radius springs 52a and 52b along axes 38a and 38b, respectively. The small radius springs 52a and 52b are fixed at one end to housing 32 and to the lens carrier 50 at the other. The large radius springs 54a and 54b are fixed at one end to the lens carrier 50 and in contact with respective adjusting screws 56a and 56b at the other. Adjusting screws 56a and 56b are threadably disposed in housing 32 or another equally fixed component of the laser instrument assembly for movement parallel to axes 38a and 38b, respectively, to apply force to the free end of the large springs 54a and 54b. The stiffness (k) of each curved leaf spring is proportional to the cube of its radius, expressed generally as:

$$k_R \propto 1/R^3 \qquad (1)$$

for the large radius springs 54a and 54b, and $$k_r \propto 1/r^3 \qquad (2)$$

for the small radius springs 52a and 52b. Thus, the small radius springs 52a and 52b will have a greater spring constant than the larger radius springs 54a and 54b.

By virtue of this arrangement, the movement experienced by the weak focusing lens 24 is approximately the same as that at the end of the small radius springs 52a and 52b. Thus, for example, with reference to FIG. 7B, where a deflection $\Delta$ is imposed on the end of the large spring 54a by a force F, the weak focusing lens 24 will translate with the small spring 52a along axis 38a in a smaller increment $\delta$. The movement seen by the weak focusing lens 24 is approximately the same as that at the end of the small radius spring 52a.

The ratio of the deflection $\Delta$ at the end of the large spring 54a to the translation $\delta$ of the center of the weak focusing lens 24 is the same as the ratio of the cube of the radii of curvature of the two curved leaf springs. This may be understood by considering that for a given force F, $$F = k_R \cdot \Delta = k_r \cdot \delta \qquad (3).$$

Substituting the relations 1 and 2 above into the equation 3, and rearranging, $$R^3/r^3 = \Delta/\delta. \qquad (4)$$

It is preferred that the ratio $\Delta/\delta = 10/1$ so that large movements of adjusting screws 56a and 56b may be enjoyed to provide fine calibration of the position of weak focusing lens 24. Any hysteresis effect accompanying adjustment with the adjusting screws 56a and 56b or variation in the screw threads which would allow backlash in the screw position, is proportionately reduced by the same ratio. The spring-loaded nature of the mounting 48 which provides fine calibration also promotes overall stability of the mounting 48 when subjected to shock or vibration.

The mounting 48 could also find application in other laser instrument assemblies, and accordingly, the spring radii R and r, spring constants k and ratios of $R^3/r^3$ can vary depending on the application and sensitivity of fine calibration and adjustment in lens position required.

The assembly 10 accordingly provides numerous advantages over the prior art. With regard to focus control and the related umbrella-like shift due to the sensitivity of the reflected plane 28 to the angle of laser light 22 striking the reflective cone 26, relative displacement between the weak focusing lens 24 and nearly collimating lens 12 provides fine control over focus. Such fine control enables the plane 28 to be produced with desired planarity without requiring the tight manufacturing tolerances present in the prior art. Assembly time is reduced, and exacting efforts experienced in the prior art to adjust the nearly collimating lens 12 to produce planarity are replaced by freely adjusting the weak focusing lens over a relatively long distance. Also, more precise focus can be achieved over the prior art. The control over focus provided by the weak focusing lens 12 enables the present invention to easily overcome and compensate for mounting errors, differences in the exact point of lasing from diode to diode, and variance in the back focal distance of nearly collimating lenses 12. Capability for adjustment which shifts the path of the laser light 22, as shown in FIGS. 5, 7A and 7B, to compensate for off-axis misalignment of the laser light source 20 and off-axis mounting errors, further permits improved, fine calibrated control over the grade of the plane 28 of laser light produced. Finally, less time and expense in assembly and production are required in accordance with the present invention to produce a superior product.

In a further aspect of the present invention, a method is provided for assembling a laser instrument assembly such as the assembly 10 described above and shown in FIGS. 1–8. The method provides improved control over the focus of a laser light beam which strikes a reflective cone 26 to produce a plane 28 of laser light.

With reference to FIGS. 1–6, the method for assembling includes the initial steps of obtaining a laser source 20 such as a laser diode, a nearly collimating lens 12 having a back focus distance defined along the focal axis 16 thereof, a weak focusing lens 24, and a reflective cone 26. The method next includes the steps of positioning the nearly collimating lens 12 in a mounting, mounting a laser diode substantially at the back focus distance 14 of the nearly collimating lens 12, and securing the nearly collimating lens 12 in the mounting. It is understood that the mounting could be a barrel 30 or mounting 34, as discussed above. The step of adjusting the position of the nearly collimating lens 12 and laser source positions the nearly collimating lens 12 to receive at least a portion of the laser light 22 produced by the laser diode and coarsely focus the laser light 22 as desired.

Next, the method calls for positioning a weak focusing lens 24 along the focal axis 16 spaced from the nearly collimating lens 12 to receive the laser light 22, positioning the reflective cone 26 along the focal axis 16 spaced from the laser diode with the nearly collimating lens 12 and weak focusing lens 24 positioned therebetween, where the reflective cone 26 is positioned to reflect at least some of the laser light 22 in an arc, adjusting the separation between the weak focusing lens 24 and the nearly collimating lens 12 to finely control the focus of the laser light 22 which is reflected to produce a plane 28 of laser light 22, and securing the weak focusing lens 24 in a mounting in a position in which it provides the necessary focus of the laser light 22 reflected in the arc to produce a plane 28. This method for assembling allows laser light 22 from the laser diode to be focused with greater control and precision onto the reflective cone 26 to produce a plane of light 28 therefrom with greater ease.

It is preferred in accordance with the method for assembling that the step of positioning the reflective cone 26 along the focal axis 16 positions the reflective cone 26 to reflect at least some of laser light 22 in an arc of 360 degrees. It is further preferred that the step of positioning the reflective cone 26, positions it generally centrally in the laser light beam to reflect radially outward a substantially uniform plane 28.

It is also preferred in accordance with the method for assembling of the present invention, that the step of adjusting the position of the nearly collimating lens 12 is performed to position the nearly collimating lens 12 such that it coarsely focuses the portion of laser light reflected in an arc to focus at a finite distance in a single plane emitting from the reflective cone 26. Further, it is preferred that the step of adjusting the separation between the nearly collimating lens 12 and the weak focusing lens 24 is performed to finely control the focus of the portion of laser light reflected in an arc to focus at a single plane emitting from the reflective cone 26.

Alternatively, in accordance with the method of the present invention, the step of adjusting the position of the nearly collimating lens 12 is performed to position the nearly collimating lens 12 to collimate the laser light 22 from the laser diode. As well, the step of adjusting the separation between the nearly collimating lens 12 and the weak focusing lens 24 may be performed to collimate beam of the laser light 22 reflected from the reflective cone.

The method of the present invention may be further defined in relation to which of the various configurations of the laser source 20, nearly collimating lens 12, and weak focusing lens 24 is being assembled. With reference to assembling the first configuration of FIG. 2, the step of positioning the weak focusing lens 24 includes positioning the weak focusing lens 24 between the laser diode and the nearly collimating lens 12. For assembling the second configuration of FIG. 3, the step of positioning the weak focusing lens 24 includes positioning the weak focusing lens 24 such that the nearly collimating lens 12 is between the laser diode and the weak focusing lens 12. In each of the first and second configurations, the step of adjusting the separation between the weak focusing lens 24 and the nearly collimating lens 12 comprises slidably adjusting the position of the weak focusing lens 24 along the focal axis 16 relative to the nearly collimating lens 12.

With reference to assembling the third and fourth configurations of FIGS. 4 and 5, respectively, the step of mounting a laser diode comprises mounting the laser diode on the same mounting 34 with the nearly collimating lens 12. In the third configuration, the weak focusing lens 24 is fixed along the focal axis 16 between the laser diode and the nearly collimating lens 12, while in the fourth configuration, the nearly collimating lens 12 is between the laser diode and weak focusing lens 24 which is fixed along the focal axis 16. In both configurations, the step of adjusting the separation between the weak focusing lens 24 and the nearly collimating lens 12 comprises slidably positioning the mounting 34 to vary the distance between the lenses.

Finally, in accordance with the present method and with reference to FIGS. 5, 7A and 7B, the method of assembling preferably includes in the step of positioning the weak focusing lens 24, the step of mounting the weak focusing lens 24 for lateral movement along at least one axis at an angle relative to the focal axis of the nearly collimating lens 12, and the further step of laterally positioning the weak focusing lens along at least one axis to adjust the angular orientation of the plane 28 of laser light 22 reflected from the reflective cone 26.

The various components of the present invention, such as the laser diode, are commercially available. The laser diode, for example, may be a Model 4442N-44 available from Mitsubishi, Nagasaki, Japan. The materials of the mountings and housings are conventional. The reflective cones are generally commercially available from various manufacturers and may be made by diamond turning techniques from aluminum material. The nearly collimating lens 12 and weak focusing lens 24 are also commercially available, and their exact parameters can vary with the application, particularly where laser instruments of different ranges are provided. However, by way of example and not limitation, where a laser instrument is provided to produce a plane having a range of approximately 200 to 300 feet according to the preferred configuration of FIG. 5, the nearly collimating lens 12 is made of Schott SFL6 glass available from Schott Glass Technologies Inc, Duryea, Pa., with a 50 millimeter (mm) focal length, and the weak focusing lens 24 is made of Schott F2 glass with a 160 mm focal length. The nearly collimating lens 12 is nominally spaced 0.22 inches from the laser diode, and the reflective cone is spaced 0.56 inches from the weak focusing lens 24. Preferably the components are secured in their positions using commercial grade adhesives.

While certain representative embodiments and details have been shown for purposes of illustrating the present invention, it will be apparent to those skilled in the art that various changes in the apparatus and method disclosed herein may be made without departing from the scope of the invention, which is defined in the appended claims.

What is claimed is:

1. A laser instrument assembly for producing a laser light along a predetermined axis, said assembly comprising:
   a laser light source for generating said laser light;
   at least one focusing lens for focusing at least one portion of said laser light;
   a lens carrier for securing said focusing lens so as to intercept said at least one portion of said laser light;
   a plurality of radial leaf springs for supporting said lens carrier and said focusing lens; and
   adjustment means for displacing at least one of said plurality of radial leaf springs such that said focusing lens is displaced in a direction which is at an angle relative to said predetermined axis to direct said portion of said laser light source along said predetermined axis.

2. The laser instrument assembly as recited in claim 1 wherein said adjustment means displaces said focusing lens in a direction substantially perpendicular to said predetermined axis.

3. The laser instrument assembly as recited in claim 1 wherein said laser light source comprises a laser diode.

4. The laser instrument assembly as recited in claim 1 wherein said plurality of radial leaf springs comprises two large radii leaf springs and two small radii leaf springs.

5. The laser instrument assembly as recited in claim 4 wherein said two large radii leaf springs are associated with said adjustment means.

6. The laser instrument assembly as recited in claim 5 wherein one of said two large radii leaf springs is attached to said lens carrier opposite one of said small radii leaf springs and the other one of said two large radii leaf springs is attached to said lens carrier opposite the other one of said small radii leaf springs.

7. The laser instrument assembly as recited in claim 6 further comprising a housing and wherein said adjustment means comprises a pair of adjusting screws threadably disposed in said housing, each of said pair of adjusting screws engaging with one of said two large radii leaf springs.

8. In a laser instrument, an assembly for producing a plane of laser light, said assembly comprising:
   a nearly collimating lens having a back focus distance defined along the focal axis thereof;
   a small laser light source substantially positioned at the back focus distance of said nearly collimating leans and oriented such that said collimated lens receives at least a portion of the laser light from said laser light source;
   a weak focusing lens disposed along the focal axis and spaced from said nearly collimating lens to receive said portion of said laser light;
   a lens carrier for mounting said focusing lens;
   a plurality of radial leaf springs for supporting said lens carrier and said focusing lens such that said focusing lens receives said portion of the laser light;
   adjustment means for displacing at least one of said plurality of radial leaf springs such that said focusing lens is proportionally displaced along at least one displacement axis which is at an angle relative to the focal axis of said nearly collimating lens to direct said portion of said laser light source along the focal axis; and
   a reflective cone positioned along said focal axis to reflect at least some of said portion of laser light substantially radially in an arc to produce a plane of light;
   whereby the spacing between said weak focusing lens and said nearly collimating lens provides fine control over the focus of said portion of laser light and, thereby, provides fine control over the planarity of said plane of light.

9. The assembly as recited in claim 8 wherein said at least one displacement axis which is at an angle to the focal axis is substantially perpendicular to the focal axis.

10. The assembly as recited in claim 8 wherein said plurality of radial leaf springs comprises two large radii leaf springs and two small radii leaf springs.

11. The assembly as recited in claim 10 wherein said two large radii leaf springs are associated with said adjustment means.

12. The assembly as recited in claim 10 wherein one of said two large radii leaf springs is attached to said lens carrier opposite one of said small radii leaf springs and the other one of said two large radii leaf springs is attached to said lens carrier opposite the other one of said small radii leaf springs.

13. The assembly as recited in claim 8 comprises a housing and wherein said adjustment means comprises a pair of adjusting screws threadably disposed in said housing, each of said pair of adjusting screws engaging with one of said two large radii leaf springs.

14. The assembly as recited in claim 8 wherein said nearly collimating lens is disposed between said small laser light source and said nearly collimating lens.

15. The assembly as recited in claim 14 wherein said weak focusing lens is disposed between said small laser light source and said nearly collimating lens.

16. A method for adjusting the path of laser light in a laser instrument, said laser instrument having a housing, said method comprising the steps of:
   providing a lens;
   mounting said lens in a lens carrier;
   mounting a plurality of radial leaf springs on said lens carrier and said housing, said radial leaf springs being mounted so as to position said lens to receive said laser light; and
   using adjustment means associated with at least one of said radial leaf springs to displace said at least one of said radial leaf springs whereby said lens is proportionally displaced along an axis at an angle to the path of said laser light to adjust the path of said laser light.

17. The method as recited in claim 16 wherein the step of using said adjustment means comprises the steps of
   providing at least one adjustment screw threadably disposed in said housing, said at least one adjustment screw engaging said at least one of said radial leaf springs; and rotating said at least one adjustment screw to displace said screw and, thereby, displace said at least one of said radial leaf springs.

18. The method as recited in claim 16 wherein said step of mounting a plurality of radial leaf springs comprises the step of providing at least two large radii leaf springs and at least two small radii leaf springs.

19. The method as recited in claim 18 wherein said step of mounting a plurality of radial leaf springs further comprises the step of mounting one of said two large radii leaf springs on said lens carrier opposite one of said small radii leaf springs.

20. The method as recited in claim 16 wherein said step of using said adjustment means comprises the step of displacing said lens along an axis substantially perpendicular to said path of said laser light.

* * * * *